US012617922B2

(12) United States Patent
Simonyan

(10) Patent No.: US 12,617,922 B2
(45) Date of Patent: May 5, 2026

(54) DEGRADATION OF SUPERABSORBENT POLYMER VIA OXIDATIVE DEGRADATION

(71) Applicant: The Procter & Gamble Company, Cincinnati, OH (US)

(72) Inventor: Arsen Simonyan, Schwalbach (DE)

(73) Assignee: The Procter & Gamble Company, Cincinnati, OH (US)

(*) Notice: Subject to any disclaimer, the term of this patent is extended or adjusted under 35 U.S.C. 154(b) by 8 days.

(21) Appl. No.: 18/100,151

(22) Filed: Jan. 23, 2023

(65) Prior Publication Data

US 2023/0167265 A1 Jun. 1, 2023

Related U.S. Application Data

(63) Continuation of application No. 17/000,413, filed on Aug. 24, 2020, now abandoned.

(30) Foreign Application Priority Data

Aug. 23, 2019 (EP) .................................... 19193221

(51) Int. Cl.
*C08J 11/16* (2006.01)

(52) U.S. Cl.
CPC ............ *C08J 11/16* (2013.01); *C08J 2333/02* (2013.01)

(58) Field of Classification Search
CPC .... C08J 11/16; C08J 2301/14; C08J 2333/02; C08J 2333/06; Y02W 30/62
See application file for complete search history.

(56) References Cited

U.S. PATENT DOCUMENTS

| | | | |
|---|---|---|---|
| 5,244,934 | A | 9/1993 | Umeda et al. |
| 5,258,173 | A | 11/1993 | Waterfield |
| 5,338,537 | A | 8/1994 | White, Jr. |
| 5,618,003 | A | 4/1997 | Akiyoshi |
| 6,143,820 | A | 11/2000 | Klier |
| 8,383,746 | B2 | 2/2013 | Torii |
| 8,517,595 | B2 | 8/2013 | Morrison, Jr. |
| 8,952,116 | B2 | 2/2015 | Kobayashi |
| 9,095,853 | B2 | 8/2015 | Somma et al. |
| 9,156,034 | B2 | 10/2015 | Somma et al. |
| 9,822,203 | B2 | 11/2017 | Haag |
| 9,850,192 | B2 | 12/2017 | Harris et al. |
| 10,881,555 | B2 | 1/2021 | Panayotova |
| 11,154,839 | B2 | 10/2021 | Collias et al. |

(Continued)

FOREIGN PATENT DOCUMENTS

| | | | |
|---|---|---|---|
| CN | 102770251 | A | 11/2012 |
| CN | 108822337 | A | 11/2018 |

(Continued)

OTHER PUBLICATIONS

All Office Actions, U.S. Appl. No. 16/548,873, filed Aug. 23, 2019.

(Continued)

*Primary Examiner* — Alicia Bland
(74) *Attorney, Agent, or Firm* — Anna E. Haller

(57) ABSTRACT

A method for degrading crosslinked and poly(acrylic acid)-based superabsorbent polymer (SAP) into soluble poly-acrylic acid polymers is disclosed. Degradation is achieved with an oxidative water-soluble salt comprising at least one cation and at least one anion.

19 Claims, 2 Drawing Sheets

(56) References Cited

U.S. PATENT DOCUMENTS

| | | | |
|---|---|---|---|
| 11,319,670 B2 | 5/2022 | Konishi | |
| 11,396,587 B2 | 7/2022 | Banaszak Holl et al. | |
| 11,525,047 B2 | 12/2022 | Collias et al. | |
| 11,649,336 B2 | 5/2023 | Collias et al. | |
| 11,746,210 B2 | 9/2023 | Collias et al. | |
| 12,104,021 B2 | 10/2024 | Kamphus et al. | |
| 12,209,144 B2 | 1/2025 | Flyer et al. | |
| 2004/0200138 A1 | 10/2004 | Parish | |
| 2004/0209753 A1 | 10/2004 | Kikushima et al. | |
| 2009/0003123 A1 | 1/2009 | Morrison, Jr. et al. | |
| 2011/0210469 A1 | 9/2011 | Keller | |
| 2012/0184670 A1 | 7/2012 | Kobayashi | |
| 2013/0010569 A1 | 1/2013 | Gansmuller et al. | |
| 2013/0172180 A1 | 7/2013 | Naumann | |
| 2016/0101210 A1 | 4/2016 | Watson | |
| 2016/0237617 A1* | 8/2016 | Yamaguchi | D21C 3/04 |
| 2017/0095792 A1* | 4/2017 | Kim | B01J 20/265 |
| 2017/0166707 A1 | 6/2017 | Jang et al. | |
| 2017/0198105 A1 | 7/2017 | Lee et al. | |
| 2017/0245443 A1 | 8/2017 | Zhang et al. | |
| 2018/0171097 A1 | 6/2018 | Layman et al. | |
| 2018/0305518 A1 | 10/2018 | Simonyan et al. | |
| 2019/0249029 A1 | 8/2019 | Gibanel | |
| 2021/0053028 A1 | 2/2021 | Collias et al. | |
| 2021/0054163 A1 | 2/2021 | Collias et al. | |
| 2021/0054164 A1 | 2/2021 | Banaszak Holl et al. | |
| 2021/0054165 A1 | 2/2021 | Simonyan | |
| 2021/0197173 A1 | 7/2021 | Ahn | |
| 2021/0388172 A1* | 12/2021 | Collias | C08J 11/105 |
| 2021/0388173 A1 | 12/2021 | Collias et al. | |
| 2022/0212165 A1 | 7/2022 | Morita | |
| 2022/0266322 A1 | 8/2022 | Kamphus et al. | |
| 2022/0267558 A1 | 8/2022 | Kamphus et al. | |
| 2022/0267559 A1 | 8/2022 | Kamphus et al. | |
| 2022/0267560 A1 | 8/2022 | Kamphus et al. | |
| 2023/0366498 A1 | 11/2023 | Nowicki | |

FOREIGN PATENT DOCUMENTS

| | | |
|---|---|---|
| EP | 1757646 A1 | 2/2007 |
| GB | 1013757 A | 12/1965 |
| GB | 2517121 A | 2/2015 |
| JP | H04317784 A | 11/1992 |
| JP | H04317785 A | 11/1992 |
| JP | H06313008 A | 11/1994 |
| JP | H09249711 A | 9/1997 |
| JP | 2001316519 A | 11/2001 |
| JP | 2003321574 A | 11/2003 |
| JP | 2004317319 A | 11/2004 |
| JP | 2012219038 A | 11/2012 |
| JP | 2019108640 A | 7/2019 |
| JP | 6574288 B1 | 8/2019 |
| JP | 2019131789 A | 8/2019 |
| JP | 2019137963 A | 8/2019 |
| WO | 2012140981 A1 | 10/2012 |
| WO | 2019151538 A1 | 8/2019 |
| WO | 2020217757 A1 | 10/2020 |
| WO | 2022081523 A1 | 4/2022 |
| WO | 2022098959 A1 | 5/2022 |

OTHER PUBLICATIONS

All Ofice Actions, U.S. Appl. No. 16/999,127, filed Aug. 21, 2020.
All Office Actions; U.S. Appl. No. 17/341,476, filed Jun. 8, 2021.
All Office Actions; U.S. Appl. No. 17/341,479, filed Jun. 8, 2021.
All Office Actions; U.S. Appl. No. 17/591,646, filed Feb. 3, 2022.
All Office Actions; U.S. Appl. No. 17/591,648, filed Feb. 3, 2022.
All Office Actions; U.S. Appl. No. 17/591,650, filed Feb. 3, 2022.
All Office Actions; U.S. Appl. No. 17/591,654, filed Feb. 3, 2022.
Basedow et al., "Ultrasonic Degradation of Polymers in Solution", Advances in Polymer Science, vol. 22, 1977, pp. 83-148.
Caruso et al."Mechanically-Induced Chemical Changes inPolymeric Materials", Chemical Reviews, vol. 109, Issue 11, Oct. 14, 2009, pp. 5755-5798.
Dubinsky et al., "Thermal Degradation of poly(acrylic acid) Containing Copper Nitrate", Polymer Degradation and Stability, vol. 86, 2004, pp. 171-178.
Ebrahimi et al., "The Study of Ultrasonic Degradation of Superabsorbent Hydrogels", vol. 2012, Article ID 343768, 06 pages.
Gurkaynak et al., "High-Temperature Degradation of Polyacrylic Acid in Aqueous Solution", Joumal of Polymer Science Part A: Polymer Chemistry, vol. 34, 1996, pp. 349-355.
Kaczmarek et al., "Photo-Oxidative Degradation of Some Water-Soluble Polymers in the Presence of Accelerating Agents", Die Angewandte Makromolekulare Chemie 261/262, 1998, pp. 109-121.
Le'pine et al., "Thermal Degradation of Polyacrylic Acid in Dilute Aqueous Solution", Polymer Degradation and Stability, vol. 75. 2002, pp. 337-345.
Li et al. "Ultraviolet-induced decomposition of acrylic acid based superabsorbent hydrogels crosslinked with N, Nmethylenebisacrylamide", Joumal of Applied Polymer Science, vol. 108, Issue 6, Jun. 15, 2008, pp. 3435-3441.
Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.
McGaugh et al., "The Thermal Degradation of Poly(Acrylic Acid)", Polymer Letters, vol. 5, 1967, pp. 817-820.
McNeill et al. "Thermal Stability and Degradation Mechanisms of Poly(Acrylic Acid and its Salts: Part 1—Poly(Acrylic Acid)", Polymer Degradation and Stability, 29 (1990), pp. 233-246.
McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.
McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.
Mierzwa et al., "UV-Hydrogen Peroxide Processes", Advanced Oxidation Processes for Wastewater Treatment, Chapter 2, University of Sao Paulo, Sao Paulo SP Brazil, 2018, 36 pgs.
Prajapat et al. "Intensification of depolymerization of polyacrylic acid solution using different approaches based on ultrasound and solar irradiation with intensification studies", Ultrasonics Sonochemistry, vol. 32, Issue 6, Sep. 1, 2016, pp. 290-299.
Saita et al., "Degradation of Sodium-Polyacrylate in Dilute Aqueous Solution II", Japanese Journal of Applied Physics, vol. 22, No. 8, Aug. 1983, pp. 1310-1314.
Shukla et al, "Ultrasonic Degradation of Poly(acrylic acid)", Journal of Applied Polymer Science, vol. 112, 2009, pp. 991-997.
Shukla et al. "Photo, thermal, and ultrasonic degradation of EGDMA-crosslinked poly (acrylic acid-co-sodium acrylate-coacrylamide) superabsorbents", Journal of Applied Polymer Science, vol. 125, Issue 1, Jul. 5, 2012, pp. 630-639.
Shukla et al., "Oxidative and Photooxidative Degradation of Poly(acrylic acid)", Polymer Degradation and Stability, vol. 94, 2009, pp. 1238-1244.
All Office Actions, U.S. Appl. No. 17/000,413, filed Aug. 24, 2020.
Extended EP Search Report and Search Opinion for 19193221.9 dated Jan. 3, 2020, 5 pages.
Search Report and Written Opinion for PCT/US2020/070430 dated Oct. 9, 2020, 9 pages.

* cited by examiner

DEGRADATION OF SUPERABSORBENT POLYMER VIA OXIDATIVE DEGRADATION

FIELD OF THE INVENTION

The present invention generally relates to oxidative degradation of poly(acrylic acid)-based superabsorbent polymer (SAP), especially useful for recycling of post-consumer used SAP. An oxidative water-soluble salt is used to degrade the SAP.

BACKGROUND OF THE INVENTION

Recycling of absorbent-hygiene products (AHPs), such as diapers and pants, feminine hygiene articles, is needed in view of the global challenges regarding sustainability. Many consumer companies strive towards using 100% recycled materials, and having zero consumer and manufacturing waste go to landfill. In addition to these goals, successful recycling benefits the environment, stimulates the economy, improves people's health and water quality, and generates energy needed by consumers in developing regions of the world.

A major component in AHPs is typically the superabsorbent polymer (SAP), whereas minor components are adhesives, cellulose fibers, polyethylene, polypropylene, and polyester. Recycling of AHPs involves cleaning of the AHPs from the soils accumulated during their use, and separating the various components into recycled material streams. More specifically, the recycled SAP material stream can be used in applications less demanding than AHPs (since the recycled SAP has inferior properties compared to virgin SAP) and/or can be converted to essentially linear or branched, non-crosslinked poly(acrylic acid) (PAA). Then, this PAA can be used as a feed material to various applications. For example, the PAA can be used as-is in applications such as water treatment or corrosion inhibition; or it can be used or further esterified and then used in adhesives, coatings, etc. These applications are part of the effort to recycle SAP into other products by replacing virgin acrylic-acid-based compounds with compounds derived from recycled SAP. In all cases, the objective is to achieve the same properties as virgin materials.

Recycled SAP can be either post-consumer recycled (PCR) SAP or post-industrial recycled (PIR) SAP. Non-limiting examples of processes that produce recycled SAP material streams from recycled AHPs are disclosed and claimed in U.S. Pat. No. 9,095,853 B2, issued on Aug. 4, 2015; and 9,156,034 B2, issued on Oct. 13, 2015; both assigned to Fater S.p.A, Italy.

Most SAPs are based on poly(acrylic acid) and are crosslinked network materials. Non-limiting examples of procedures used to produce SAPs from acrylic acid and crosslinkers are disclosed in U.S. Pat. No. 8,383,746 B2, issued on Feb. 26, 2013, and assigned to Nippon Shokubai Co., Ltd, Japan; and U.S. Pat. No. 9,822,203 B2, issued on Nov. 21, 2017, and assigned to BASF SE, Germany.

There are many references on attempts to degrade or de-polymerize linear polymers and only a few references on efforts to depolymerize SAPs, which comprise branched PAA cross-linked into a polymer network. The typical forms of energy used in these efforts (either as single forms of energy or in combination) are ultrasound, UV, mechanical (i.e., in the presence of extensional/elongational forces; example: Caruso, M. M., et al., Chem. Rev., 109 (2009), 5755-5798), thermal (example: McNeill, I. C., and Sadeghi, S. M., Polymer Degrad. Stability, 29 (1990), 233-246), and microwave.

However, there is a need to degrade post-industrial recycled (PIR) SAP (e.g. derived from un-used AHPs which are sorted out during manufacturing and not provided to consumers, or derived from SAP manufacturing processes, e.g. when the SAP did not meet the required performance criteria) and, especially, to degrade post-consumer recycled (PCR) SAP derived from post-consumer AHPs (i.e. after the AHPs have been used). Thus, there is a need to degrade or de-polymerize recycled SAP into soluble, linear or branched, poly(acrylic acid) (PAA) in short time scale, with low energy and power per unit mass of SAP, and at mild conditions, e.g. relatively low temperature and without use of chemicals considered environmentally problematic. The requirement for low energy per unit mass of SAP stems from the fact that the recycling of SAP and its degrading or de-polymerization to PAA is beneficial only if the energy spent during the converting of SAP to PAA is less than that used to make fossil-derived acrylic acid (petro-AA) from propylene, which is about 50 MJ/kg AA. The PAA produced from recycled SAP can then derivatized into materials for other applications such as adhesives, coatings, water treatment, fabric care, etc.

SUMMARY OF THE INVENTION

The invention relates to a method for degrading cross-linked and poly(acrylic acid)-based superabsorbent polymer (SAP) into soluble polyacrylic acid polymers. The method comprises the steps of:

a) providing SAP,
b) providing an oxidative water-soluble salt comprising at least one cation and at least one anion;
c) providing an aqueous carrier, such as water or physiological saline (i.e. a solution with 0.90% by weight of NaCl per liter of water),
d) Mixing the SAP with the oxidative water-soluble salt and the aqueous carrier,
e) heating the mixture to a temperature of from 30° C. to 200° C. to degrade the SAP into soluble polyacrylic acid polymers (PAA).

The oxidative water-soluble salt may dissolve in the aqueous carrier in method step d), or, preferably, prior to method step d).

The at least one anion may be selected from the group consisting of: peroxydisulfate, peroxymonosulfate, peroxydicarbonate, peroxydiphosphate, peroxydiborate and mixtures and combinations thereof. Preferably, the at least one anion is a peroxydisulfate.

DETAILED DESCRIPTION OF THE INVENTION

Definitions

Figure 1:
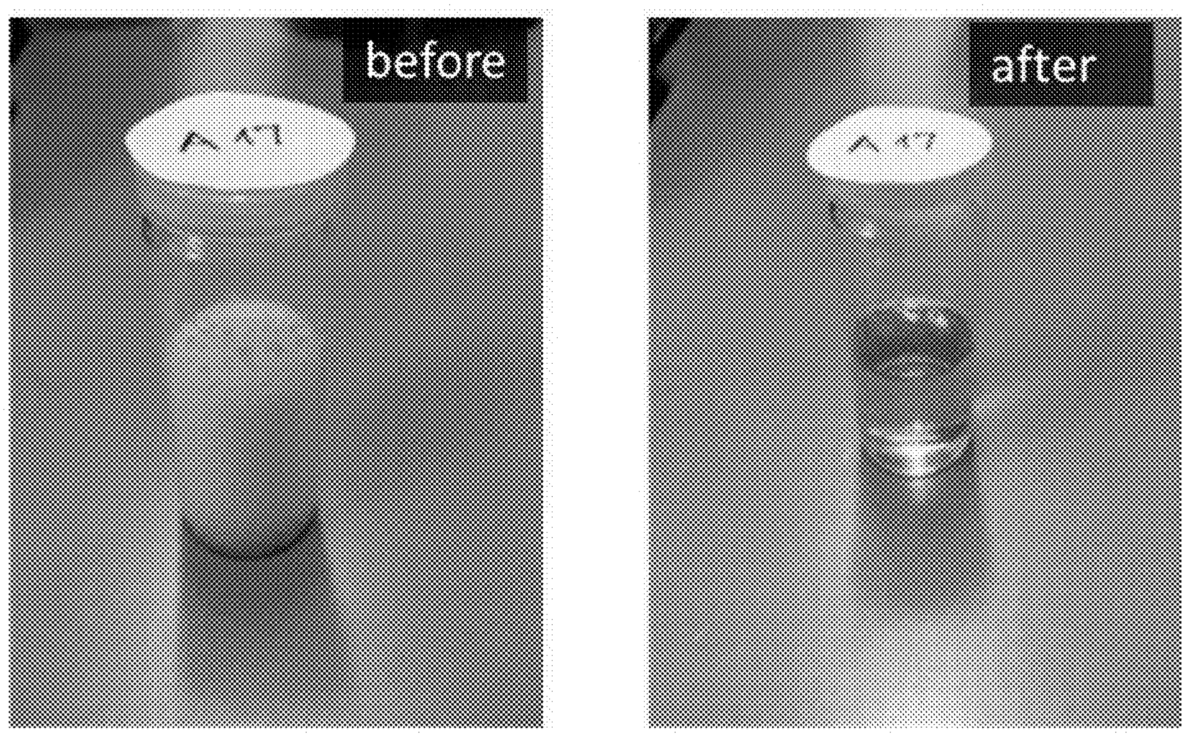
FIG. 1 shows photos of example A17 before and after step degradation, i.e. the photo on the left shows the sample after step 5 of the experimental procedure described below and the photo on the right shows the sample after the experimental procedure is completed.
Figure 2:
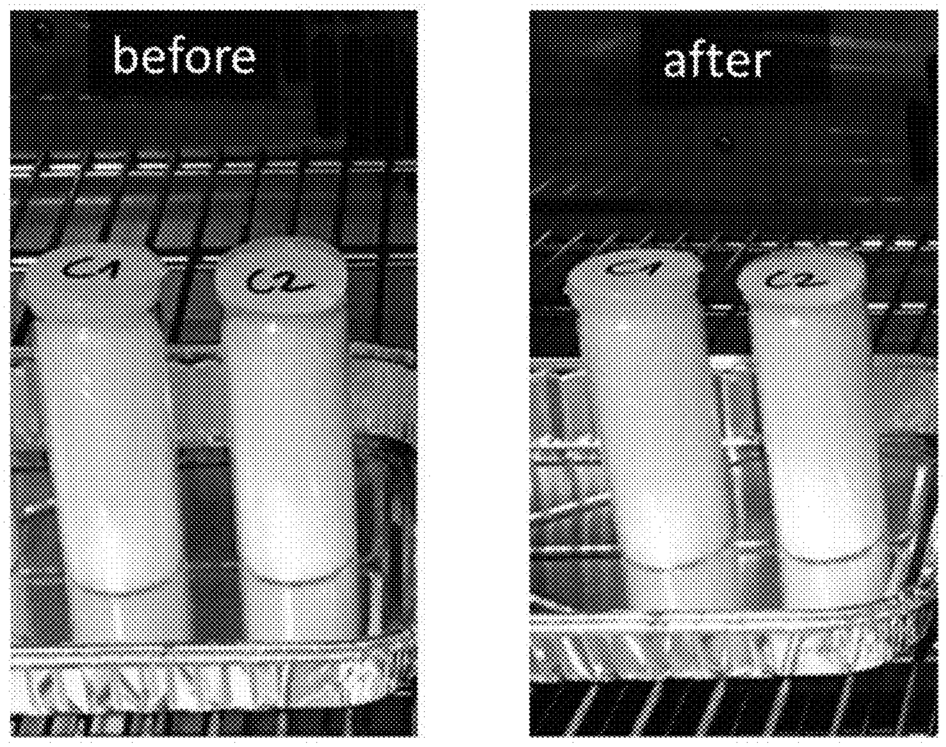
FIG. 2 shows photos of comparative examples C1 and C2 before and after step degradation, i.e. the photo on the left shows the samples after step 5 of the experimental procedure described below and the photo on the right shows the samples after the experimental procedure is completed. As can be seen, no degradation has taken place in examples C1 and C2.

As used herein, "superabsorbent polymers" refer to absorbent materials which are crosslinked and poly(acrylic acid)-based superabsorbent polymers that can absorb at least 10 times their weight of an aqueous 0.9% saline solution as measured using the Centrifuge Retention Capacity (CRC) test method (EDANA method NWSP 241.0.R2). These polymers are typically used in particulate forms ("superabsorbent polymer particles"). The term "particles" refers to granules, fibers, flakes, spheres, powders, platelets and other shapes and forms known to persons skilled in the art of superabsorbent polymer particles.

The superabsorbent polymer particles may be spherical-like superabsorbent polymer particles or ellipsoidal-like superabsorbent polymer particles or irregular-like superabsorbent polymer particles or fibers-like superabsorbent polymer particles, i.e. elongated, acicular superabsorbent polymer particles.

As used herein, the term "poly(acrylic acid)" or "PAA" refers to an essentially un-crosslinked poly(acrylic acid) molecule with acrylic acid as the monomeric unit. In contrast to SAP, PAA are water-soluble. The PAA of the present invention may be linear or branched. The PAA of the present invention may comprise oxygen-containing side- or end-groups due to the reaction mechanism of the present invention. The PAA may further comprise very small quantities of the reaction product of crosslinkers which were used when making the SAP provided to the method of the present invention for degradation. The SAP provided for the present invention may comprise less than 0.2 mol-% of the reaction product of crosslinkers based on the amount of acrylic acid. For the purposes of the present invention, PAA includes polymers of acrylic acid and oligomers of acrylic acid. Preferably, PAA are polymers having an average molecular weight Mw of up to 10 MDa, more preferably up to 10 MDa. More preferably, the PAA are polymers having an average molecular weight of at least 1 kDa, or at least 5 kDa, or at least 10 kDa.

As used herein, the term "degradation" refers to the conversion of SAP into PAA via the actions of de-polymerization, de-crosslinking, molecular backbone breaking, or any combination of the above actions. For the purposes of the present invention, the terms degradation, recycling, and conversion are used interchangeably, as long as they refer to the transformation of SAP to PAA.

As used herein, the term "absorbent-hygiene product", "AHP" refers to devices that absorb and contain body exudates, and, more specifically, refers to devices that are placed against or in proximity to the body of the wearer to absorb and contain the various exudates discharged from the body. Absorbent articles include diapers (e.g. baby diapers and diapers for adult incontinence), absorbent pants, absorbent inserts, feminine care absorbent articles such as sanitary napkins or pantiliners, and the like. The term "exudates" includes, but is not limited to, urine, blood, vaginal discharges, sweat and fecal matter. Preferred AHPs of the present invention are diapers, absorbent pants and/or feminine care absorbent articles. AHPs from which post-industrial or post-consumer SAP's, which may be provided for the method of the present invention, may be derived may be disposable.

"Disposable" is used in its ordinary sense to mean an article that is disposed or discarded after a limited number of usage over varying lengths of time, for example, less than 20 usages, less than 10 usages, less than 5 usages, or less than 2 usages. If the disposable absorbent article is a diaper, a pant, sanitary napkin, sanitary pad or wet wipe for personal hygiene use, the disposable absorbent article may (and most often is) intended to be disposed after single use.

Degradation Method

Unexpectedly, it has been found that SAP can be degraded into soluble PAA, especially in the form of polymers of acrylic acid by mixing the SAP with an oxidative water-soluble salt (herein after referred to as "salt"). The salt comprises at least one cation and at least one anion. The SAP and salt are mixed with an aqueous carrier, such as water or physiological saline.

By heating the mixture to a temperature of from 30° C. to 200° C. (hereinafter referred to as "elevated temperature") at least some of the anions are decomposed into radicals.

The elevated temperature may be at least 35° C., or at least 40° C., or at least 50° C., or at least 60° C., or at least 70° C., or at least 80° C. The elevated temperature may be less than 190° C., or less than 180° C., or less than 150° C. Generally, at elevated temperatures exceeding 200° C., The SAP starts to break down and decay in an uncontrolled manner, which is not desirable for the present invention.

Upon heating, a hydrogen atom of the salt, more specifically: a hydrogen atom of the anion(s) of the salt, is abstracted and the anion forms a radical. The elevated temperature to which the mixture is heated may be at least 10° C. below the decomposition temperature of the salt (leading to radical formation), or the mixture may be heated to an elevated temperature that is at least the decomposition temperature, or may be heated to an elevated temperature of at least 10° C. above the decomposition temperature of the salt.

The "decomposition temperature", as used herein, is the 10-hour half-life temperature in water, which, for example, is 69° C. for ammonium persulfate and 60° C. for potassium persulfate.

Thus, the choice of the most optimal temperature range inter alia depends on the choice of the salt, as different salts (specifically different anions) have different decomposition temperatures. The radicals, which have been formed, can react with the SAP, e.g. by reacting with an aliphatic C—H group comprised in the polymer chains of the SAP. As a result of this radical reaction, the polymer chain of the SAP is broken-up and a carbon-centered radical is formed at the broken up SAP polymer chain. The reaction may also take place at a carboxyl group of the SAP, also leading to a carbon-centered radical. Still alternatively or in addition, the reaction may take place at a nitrogen atom, which may be comprised by a cross-linker that has been used to initially make the SAP. If the reaction takes place at a nitrogen atom, a nitrogen-centered radical is formed instead of a carbon-centered radical.

Without wishing to be bound by theory, it is believed that the following reaction scheme exemplarily shows the degradation process of the SAP into soluble PAA (i.e. the "decrosslinked polymer products" below):

$$S_2O_8^- \xrightarrow{k_1} 2SO_4^-,$$

$$SO_4^- + H_2O \xrightarrow{k_2} HSO_4^- + OH.$$

(Generation of sulfate and hydroxyl radical in aqueous media) and SAP. Such preheating may accelerate the degradation method. Alternatively, the aqueous carrier may be pre-

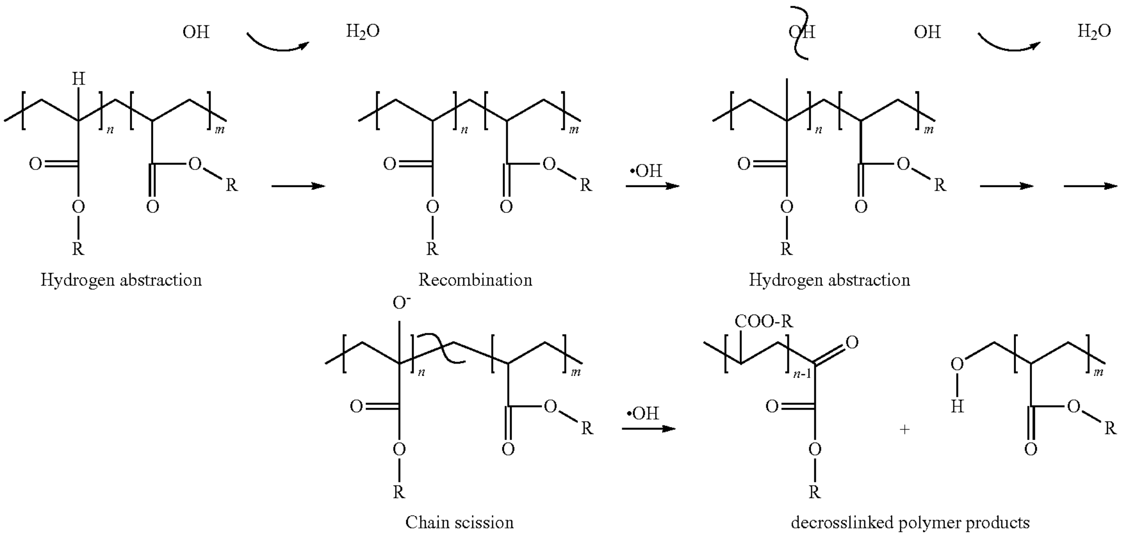

wherein R is H, or alkaline cation, ammonium cation, or crosslinking residue

The mixture may be maintained at the elevated temperature for from 10 minutes to 5 hours, preferably from 10 minutes to 4 hours, more preferably from 10 minutes to 3 hours. Shorter times are preferred from an economical perspective. Shorter process times may be obtained e.g. by higher salt concentration, higher temperatures (however, below 200° C.) and/or by optimized mixing of SAP and salt. The time during which the mixture is kept at the elevated temperature also depends on the degree of degradation that is desirable (i.e. average molecular weight of PAA obtained by the process). Generally, once the SAP has been degraded such that no, or only minor amounts of, insoluble SAP are present, indicating that all SAP has been decomposed into soluble PAA, the mixture may no longer need to be maintained at the elevated temperature and the temperature may be decreased to room temperature (25° C.) or below.

The SAP, salt and aqueous carrier may be mixed, e.g. by pre-mixing the salt and the aqueous carrier, such that the salt is, partly or completely, dissolved in the aqueous carrier. The aqueous carrier with the salt dissolved therein can then be mixed with the SAP, such as by spraying the aqueous carrier with dissolved salt onto the SAP. After having sprayed the aqueous carrier with dissolved salt onto the SAP, the mixture may or may not be further mixed, depending e.g. on the amount of SAP, i.e. the thickness of the layer of SAP. If the aqueous carrier with dissolved salt is sprayed onto a thin layer of SAP such that the SAP is appropriately contacted with the aqueous carrier and dissolved salt, further mixing may not be necessary.

Alternatively to pre-mixing the aqueous carrier with the salt to dissolve the salt in the aqueous carrier, it is also possible to provide the aqueous carrier and the salt separately to the SAP, such that the salt is only dissolved in the aqueous carrier after having been mixed with the SAP. Importantly, the salt has to be able to dissolve in the aqueous carrier, either after being contacted with the SAP or, preferably, prior to being contacted with the SAP.

The aqueous carrier may be pre-heated to the elevated temperature prior to mixing the aqueous carrier with the salt heated, however to a temperature below the elevated temperature prior to mixing with the salt and SAP. Still further alternatively, the aqueous carrier may not be pre-heated prior to mixing with the salt and SAP and the heating to the elevated temperature is done after aqueous carrier, salt and SAP are mixed.

If the salt is dissolved in the aqueous carrier prior to mixing with the SAP, the aqueous carrier may be pre-heated to a temperature below the elevated temperature to avoid that the anions prematurely form radicals, such that the anions degrade by self-decomposition and are subsequently no longer available for degradation of the SAP after mixing with the SAP. However, if the salt is dissolved in the aqueous carrier only a short time or immediately before mixing with the SAP, the aqueous carrier may be pre-heated to the elevated temperature before mixing with the SAP. Preheating may speed up the time for the salt to dissolve in the aqueous carrier.

Alternatively, or in addition, the SAP may be pre-heated to the elevated temperature or to a temperature below the elevated temperature before mixing with the aqueous carrier and salt. Pre-heated SAP may lead to shorter swelling time of the SAP, thus accelerating the absorption of the aqueous carrier and dissolved salt into the SAP particles, enabling faster degradation. Faster absorption of the dissolved salt into the SAP may also improve homogenous dispersion of the dissolved salt within the SAP, which may help more homogeneous degradation, thus avoiding that non-degraded pieces of the SAP are left in the mixture.

Still alternatively, the mixture obtained in method step d) may be heated to the elevated temperature only after at least 50 weight-%, or at least 70 weight-%, or at least 90 weight-% or all of the aqueous carrier with salt dissolved therein has been absorbed into the SAP. Some pre-heating to a temperature below the elevated temperature may nevertheless already be done before.

The ratio of salt to SAP may be from 0.001 g of salt to 0.05 g of salt per 1 gram of SAP, or may be from 0.005 g of salt to 0.03 g of salt per 1 gram of SAP, or may be from 0.01 g of salt to 0.03 g of salt per 1 gram of SAP.

The ratio of aqueous carrier to SAP may be from 2 g to 20 g of aqueous carrier per 1 gram of SAP, or may be from 5 g to 15 g of aqueous carrier per 1 gram of SAP.

The SAP may be provided in method step a) dry or swollen to less than 20 g, or less than 15 g, or less than 10 g, or less than 5 g of liquid (such as water or physiological saline) per gram of SAP.

The total amount of liquid absorbed into (i.e. comprised in) the SAP in method step e)—including the liquid comprised in the swollen SAP as provided in method step a) (if the SAP is not provided as dry SAP) and the amount aqueous carrier absorbed into and thus comprised by the SAP in method step e), may be from 2 g to 25 g per 1 gram of SAP, or may be from 2 g to 20 g per 1 gram of SAP, or may be from 5 g to 15 g per 1 gram of SAP, or may be from 8 g to 13 g per 1 gram of SAP. As used herein, "dry SAP" means that the SAP has a liquid content of less than 0.20 g per gram of SAP, preferably less than 0.15 g per gram SAP (referred to as "moisture content"). The moisture content of the SAP is measured according to the EDANA Moisture Content Test Method NWSP 230.0.R2 (15) or via a Moisture Analyzer (HX204 from Mettler Toledo, drying temperature 130° C., starting superabsorber weight 3.0 g $$(\pm 0.5\ g),$$

stop criterion 1 mg/140 s). If the moisture content of the superabsorbent polymer particles is greater than 3 weight %, then the SAP are dried to a moisture level of <3 weight-%, e.g. in an oven at 105° C. for 3 h or e.g. at 120° C. for 2 h.

To ensure that the salt can be used to efficiently degrade the SAP, it is desirable that a significant amount of the aqueous carrier, with the salt being dissolved therein, is absorbed into the SAP in method step d) and e). At least 50 weight-%, or at least 60 weight-%, or at least 75 weight-%, or at least 90 weight-%, or 100 weight-% of the aqueous carrier provided in step c), with the salt dissolved therein, may be absorbed into the SAP. Absorption of the aqueous carrier, with salt dissolved therein, in method step d) and e) means, that the aqueous carrier, with salt dissolved therein, may be absorbed in method step d) only (this will be the case especially when 100 weight-% are absorbed), or predominantly in method step e) (this may be the case if the heating is already starting while the SAP, salt and aqueous carrier are mixed), or a portion of the aqueous carrier with salt dissolved therein is absorbed into the SAP in method step d) while another portion of the aqueous carrier with salt dissolved therein is absorbed into the SAP in method step e).

The SAP provided in method step a) may have a Centrifuge Retention Capacity (CRC) value of from 10 g/g to 50 g/g, or from 10 g/g to 40 g/g. if recycled AGM, needs to be dried and then measure CRC as measured according to the CRC test method (EDANA method NWSP 241.0.R2).

If the SAP provided in method step a) is post-consumer recycled SAP, (a sample of) the SAP has to be dried first and then CRC is measured for this sample to determine the CRC of the SAP.

The at least one anion of the salt may be selected from the group consisting of: peroxydisulfate, peroxymonosulfate, peroxydicarbonate, peroxydiphosphate, peroxydiborate, or mixtures thereof.

The at least one cation of the salt is not critical in that the cation does not dissociate into radicals. Thus, the choice of the cation does not directly impact the degradation process because the cation does not form radicals. The at least one cation may be chosen to have sufficient solubility in the aqueous carrier, and it should be available at relatively low cost. The at least one cation may be selected from the group consisting of: $Li^+$, $Na^+$, $K^+$, $Rb^+$, $Cs^+$, $NH_4^+$, organically substituted ammonium, Ca2+, Mg2+, Sr2+, Ba2+, Al3+, transition metal cations of 1+ to 3+ oxidation state, or mixtures thereof (e.g. combinations of different salts having different cations). Most preferred are one or more alkaline cations and $NH_4^+$ cations.

At least 50% by total weight of the salt, or at least 60% by weight, or at least 70% by weight, or at least 80% by weight, or at least 90% by weight, or 100% may be an alkaline persulfate.

Hydrogen peroxide may be added in the method. Hydrogen peroxide can help to increase the yield per time of PAA, i.e. the rate of degradation. Hydrogen peroxide can also help to decolorize the decomposed contaminants. The hydrogen peroxide may be added to the SAP as a separate aqueous solution, or it may be added in the aqueous carrier, with or without the salt being dissolved in the aqueous carrier, prior to mixing with the SAP. The amount of hydrogen peroxide used in the method of the present invention may be from 10 weight-% to 200 weight-% based on weight of the salt, or may be from 20 weight-% to 100 weight-% by weight of the salt, or may be from 30 weight % to 80 weight-% by weight of the salt.

Method step e) may be carried out at a pH of 3-7. Typically, no further, special measures are required to obtain a pH in this range. Persulfate radicals, for example, as less stable at pH above 7.

Additives may be used in the method of the present invention. For example, small molecular weight alcohols, such as methanol, ethanol, propanol, isopropanol, butanol, ethylene glycol, propylene glycol, glycerin or mixtures thereof may be added to the aqueous carrier provided in method step c) or added to the mixture of method step d). These additives may support the initial wettability of the SAP with aqueous carrier and salt dissolved therein. They may also improve the stability of the aqueous carrier against bacterial contamination. Other additives such as anti-bacterial additives may also be added. The total amount of additives may not be more than 10 weight-%, or not more than 8 weight-%, or not more than 5 weight-%, or not more than 3 weight-% based on the weight of the aqueous carrier.

The method of the present invention can be carried out in a continuous process or as a batch process. Generally, continuous processes are often preferred from a commercial/cost perspective. In a continuous process, the SAP may, for example, be provided in a continuous stream, e.g. on a carrier belt or the like, and aqueous carrier and salt are mixed with the SAP, e.g. by spraying the aqueous carrier and salt (and, optionally, the hydrogen peroxide) onto the SAP. The mixture of SAP, salt and aqueous carrier can be transferred onto a belt after method step d) (e.g. after the aqueous carrier with salt dissolved therein has been partly or fully absorbed into the SAP) and heated in a continuous or batch fashion.

Alternatively, the aqueous carrier can be provided in a batch vessel or similar container (with salt dissolved therein prior to or after providing the aqueous carrier into the vessel. SAP can then be added in the vessel, which already is filled with the aqueous carrier and dissolved salt. and the SAP may be left to absorb the aqueous carrier and salt dissolved therein and, simultaneously or subsequently, the mixture can be heated to the elevated temperature.

For SAP, especially if provided as dry SAP particles, air tends to tends to be "trapped" between the particles, i.e. in the interstices between the SAP particles as they absorb liquid and swell. Hence, the swollen SAP tend to "float" in liquid. As the SAP are degraded, the solubilized PAA may sink down in the vessel, where it can (continuously) be removed. To avoid that non-degraded or partly degraded SAP are removed together with the PAA (as some SAP may sink in the vessel), a mesh or the like may be installed within the vessel to hinder the non- or fully degraded SAP particles from sinking further to the bottom of the vessel, as they will be captured in the mesh until they are more fully degraded and able to pass through the mesh.

Alternatively, the mixture of SAP, salt and aqueous carrier may also be stirred such that the swollen SAP particles sink towards the ground of a vessel and the soluble PAA, i.e. the product of the method, can be removed from the upper part of the vessel.

The obtained solution with the PAA solubilized therein, may be transferred, e.g. via pumps, to a different vessel, to a pipe, or any other appropriate device, for any posttreatment that may be desired for the solution. Possible post-treatments are filtration, desalination or numerous other treatments.

The energy consumption of the degradation process inter alia depends on the elevated temperatures. The higher the elevated temperature, the higher the energy consumption per time (i.e. a short process time at higher elevated temperature may overall require less energy than a relatively lower elevated temperature with relatively longer process time). For example, the energy consumption is about 3.5 MJ/kg dry AGM for an elevated temperature of about 100° C. for a batch process in an insulated vessel, i.e. a process where the heating to the elevated temperature is done only once.

SAP Provided in Method Step a)

The SAP provided in method step a) may be in particulate form.

The SAP provided in the method can be virgin SAP, post-consumer recycled SAP (PCR SAP), post-industrial recycled SAP (PIR SAP), or a combination of those materials. "Post-consumer SAP" and "post-consumer recycled SAP" (PCR SAP) are used herein interchangeably and, as used herein, refer to SAP which has been comprised by an AHP and the AHP has been used by a consumer (e.g. worn by an incontinent user). After use, the AHP is recycled and the PCR SAP is isolated from the AHP. However, for the method of the present invention, it is not necessary that the SAP is purified such that no other components of the post-consumer AHP are comprised by the post-consumer SAP which is provided for the method of the invention.

"Post-industrial SAP" and "post-industrial recycled SAP" (PIR SAP) are used herein interchangeably and, as used herein, refer to SAP which may or may not have been comprised by an AHP. The PIR SAP has not been previously used, e.g. it was not comprised by an AHP which has been used by a consumer. Instead, the PIR SAP may be derived from AHPs which have been sorted out during production, e.g. because they are defective. The PIR SAP may also have been sorted out during SAP production, e.g. because they do not meet the required performance targets (such as capacity, whiteness or the like). Thus, for the latter scenario, the PIR SAP was not previously comprised by an AHP.

The typical properties of SAP are mechanical properties, swelling capacity, saline flow conductivity (SFC), absorption against pressure (AAP), residual monomer, extractables, and cylinder retention capacity (CRC). Also, for the purposes of the present invention, the SAP can include other co-monomers, such as itaconic acid, acrylamide, etc., The amount of co-monomers may be less than 2.0 weight-%, or less than 1.5 weight-%, or less than 1.0 weight-%, or less than 0.5 weight-% per total weight of the dry SAP.

SAP is typically prepared using a homogeneous solution polymerization process or by multi-phase polymerization techniques, such as inverse emulsion or suspension polymerization. The polymerization reaction is generally done in the presence of a relatively small amount of di- or poly-functional monomers, such as N,N'-methylene bisacrylamide, triacrylate, ethylene glycol de(meth)acrylate, triallylamine, etc. The di- or poly-functional monomer compounds serve to lightly crosslink the acrylate polymer chains, thereby rendering the SAP water-insoluble, yet water-swellable. Furthermore, SAP can be surface-crosslinked after polymerization by reaction with a suitable crosslinking agents, such as di/poly-epoxides, di/poly-alcohols, di/poly-haloalkanes, etc. SAP provided for the method of the present invention may be in particulate form. The particulate form may be produced from a slab of material with any typical size reduction techniques, such as milling.

SAP can be fully un-neutralized (in which case, DN=0), fully neutralized (in which case, DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

The SAP provided to the method of the present invention may be in dry form or may be partly swollen with water, saline or urine (e.g. urine in PCR SAP). Hence, the SAP may be swollen to from 0.05 g/g to 20 g/g with water, saline or urine, preferably to from 0.05 g/g to 15 g/g, more preferably to from 0.10 g/g to 10 g/g, more preferably to from 0.20 g/g to 5 g/g, and even more preferably to from 0.50 g/g to 2 g/g. Completely dry (i.e. 0 g/g of water, saline or urine) may be less advantageous for the method of the present invention, because it takes longer for completely dry SAP to absorb the aqueous carrier with the salt dissolved therein. On the other hand, SAP which is excessively swollen (or even fully swollen) when provided to the method, may also lead to an increase in time until the salt dissolved in the aqueous carrier is absorbed into the SAP. The SAPs provided to the method may have an absorbent capacity CRC (measured as Centrifuge Retention Capacity "CRC" according to EDANA method NWSP 241.0.R2) of from 10 g/g to 50 g/g.

The amount of aqueous carrier provided in method step c) may be such that the SAP provided in step a) are able to swell to at least 20%, or at least 30%, 50%, or at least 60% or at least 70%, or at least 80% of their CRC upon absorption of all aqueous carrier provided. If the SAP not provided dry but pre-swollen (see further details below), the less aqueous carrier is required to obtain the desired degree of SAP load, i.e. the desired CRC.

Upon absorption of liquid, the polymer chains within the polymer network of the SAP start to disentangle. Such disentanglement will make the polymer network easier accessible for the radicals formed from the anions of the salt. Hence, degradation is improved. If the amount of aqueous carrier provided in step c) does not enable the SAP to swell to at least 20% of their CRC upon absorption of the aqueous carrier, the polymer chains within the polymer network of the SAP may not be able to sufficiently disentangle, making degradation slower or overall less effective.

For the degradation method of the present invention, the use of post-consumer SAP may be beneficial over the use of virgin SAP: The polymer chains in the polymer network of a previously swollen and then at least partly red-dried SAP have already been disentangled. Re-swelling and thus anewed disentanglement is believed to be faster versus swelling of virgin SAP. Previously swollen and then re-dried SAP has been found to have higher CRC when being swollen after re-drying compared to the CRC measured when swelling the SAP for the first time from virgin SAP.

If post-consumer SAP is provided in partly swollen form for the method of the present invention, it is also advantageous that there is no need to completely dry the SAP for use in the method, given that drying of post-consumer SAP is time- and energy consuming. However, post-consumer SAP may be sterilized prior to providing it to the method of the invention.

If post-consumer SAP or post-industrial SAP are isolated from AHPs to be provided for the method of the present invention, the SAP does not necessarily need to be purified such that no other components of the AHPs are present. Instead, it has been found that the SAP may be contaminated with other components of the AHP, such as synthetic fibrous materials or films (e.g. fibers, sheets, films, and fibrous layers), cellulose fibers, adhesives, inks, dyes, surfactants etc. The amount of these contaminants may not be more than 20% by weight of the mixture of SAP and contaminants, or may not be more than 15% by weight, or not more than 10% by weight, or not more than 5% by weight, or not more than 2% by weight, or not more than 1% by weight.

If the post-consumer SAP is still swollen, e.g. with urine or other liquid, this urine or other liquid comprised by the SAP is not taken into consideration when calculating the amount of contaminants by weight of the mixture of SAP and contaminants.

If the SAP is provided as dry SAP for the present invention, the average particle size of the post-consumer SAP may optionally be reduced, e.g. by milling, grinding or other suitable means. The D50 average particle size of the dry SAP (whether PCR SAP, PIR SAP or virgin made SAP) provided for the present invention may be from 100 μm to 1,000 μm as measured according to ISO method 13322-2. The particle size distribution (PSD) of the of the dry SAP may be from 40 μm to 5,000 μm, or from 50 μm to 2,000, or from 50 μm to 1,000 μm, or from 50 μm to 800 μm.

If the SAP is provided in pre-swollen form, e.g. as post-consumer SAP, which was not or only partly dried after recycling, the SAP may be subjected to comminution to increase the surface area of the SAP, which may enable faster absorption of the aqueous carrier with the salt dissolved therein. Such faster absorption may, in turn, lead to faster degradation of the SAP. Comminution may, for example, be done by wet grinding.

Smaller particles sizes can help fast and homogeneous absorption of the dissolved salt into the SAP, leading to faster and more complete degradation of the SAP.

Optional method step f) of separating the soluble polyacrylic acid polymers in the aqueous solution from other compounds and components in the mixture:

Once the SAP has been decomposed into PAA, the PAA may be separated from the mixture of (possibly remaining non-decomposed) SAP, salt, aqueous carrier and optional further components (such as hydrogen peroxide). The mixture may still comprise a certain amount of non-decomposed SAP, which may be present in the mixture as solid, insoluble component.

The PAA can be extracted from the mixture via a number of processes. Non-limiting examples of these processes are water evaporation, filtration of the PAA, water extraction, etc. Also, the salts can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc. The same techniques can generally also be applied to remove other small molecular weight compounds in the mixture, e.g. other typical compounds of the post-consumer AHPs such as adhesives, inks, dyes, surfactants, and degradation products of these compounds.

For example, filtration may be used to eliminate the solid compounds and components from the mixture, i.e. for method step d) of separating the soluble polyacrylic acid polymers in the aqueous solution from other compounds and components in the mixture obtained by step c). Solid compounds and components may be remaining insoluble SAP and other components of post-consumer AHPs, such as synthetic fibrous materials or films (fibers, sheets/films/fibrous layers) and cellulose. Notably, polyolefins (e.g. polypropylene, polyethylene) comprised by the other components of post-consumer AHPs, such as the synthetic fibrous materials or films, are not soluble or swellable in the aqueous carrier. They may only react with the salt to a negligible extent, i.e. the polyolefins are not or only insignificantly degraded by the method of the present invention. The same apply for PET, which may also be comprised by the synthetic fibrous materials or films. Thus, those materials will remain as solid components in the mixture and may be filtered out.

PEG, another typical component in post-consumer AHPs, e.g. comprised in surfactants, is degraded by the method of the present invention. However, the PEG is typically degraded into molecules of relatively small molecular weight, which is significantly smaller than the molecular weight of the PAA. Hence, the small molecular weight reaction products of PEG can be separated from the soluble PAA polymers, e.g. by the techniques described above.

Alternatively, or in addition, the mixture of PAA. (possibly remaining parts of) SAP, salt and aqueous carrier, which may comprise compounds of post-consumer AHPs, may also be mixed in a co-solvent in which the PAA is not soluble such that the PAA will precipitate to isolate it from the mixture. Prior to such mixing in a co-solvent, solid compounds in the mixture may be removed by filtration.

PAA Obtained by the Method

The PAA obtained by the degradation method of the present invention may have varying molecular weight. The PAA may or may not comprise oligomers. Preferably, the PAA does not comprise oligomers, i.e. PAA relates to polymers only. The average molecular weight Mw of the PAA may be up to 10 MDa, or up to 5 MDa. The average molecular weight Mw of the PAA may be at least 10 kDa, or at least 20 kDa. The PAA may be linear or branched. However, the PAA are not cross-linked and hence they are water-soluble.

The PAA obtained by the method of the present invention can be used or derivatized into materials for other applications such as adhesives, coatings, water treatment, etc. In one embodiment of the present invention, the PAA, either as is or derivatized, is used in an adhesive. In yet another embodiment of the present invention, the PAA, either as is or derivatized, is used in fabric care applications. In even yet another embodiment of the present invention, the PAA, either as is or derivatized, is used in water treatment applications.

EXAMPLES

Experimental Procedure

Several samples of SAP were subjected to the method of the present invention. The SAP used in all examples was polyacrylic acid-based SAP having a capacity (CRC) of 27.6 g/g, a moisture content of 0.4%, and D50 average particle size was 398 μm as measured according to ISO method 13322-2 (the Particle Size Distribution PSD was 63-710 μm). The Absorption Against Pressure (AAP) of the SAP was 25.5 g/g, as determined by the EDANA method WSP 442.2-02. In deviation from EDANA WSP 442.2-02, a pressure of 0.7 psi is applied (whereas the EDANA method specifies a pressure of only 0.3 psi).

The deionized water used below is MilliporeQ. Electrical conductivity was measured with lab conductometer COND 70 INSTRUMENT without CELL, #50010522, equipped with Cell VPT51-01 C=0.1 from XS Instruments or via LF 320/Set, #300243 equipped with TetraCon® 325 from WTW, conductivity is <160 μS/cm at 0° C. Similar equipment for measuring electrical conductivity can be used accordingly. The deionized water used in the examples represents the aqueous carrier. The actual amount of deionized water (=aqueous carrier) in the sample is indicated in Table 1 in column "m_w_total".

Unless stated otherwise, the experimental procedure was performed in a climate conditioned room at standard conditions of $$23° C.\pm 2° C.$$

temperature and $$45\% \pm 10\%$$

relative humidity.

Procedure:

1. A stock 0.5 weight-% solution of potassium persulfate (KPS) was prepared by completely dissolving by stirring 5.0 g of dry salt (Sigma-Aldrich, >=99.0% purity, inventory number 216224-500G) into 995.0 g deionized water (i.e. the aqueous carrier in a 1 L plastic bottle (made of HDPE, Nalgene™). Complete dissolution of the KPS salt is observed when no visible salt crystals remain in the solution.
2. A stock 1.0 weight-% solution (30.0 g) of hydrogen peroxide (HPO) was prepared and used fresh (within 24 hours) by adding 1.0 g of 30 weight-% HPO (a.k.a. Perhydrol, Sigma-Aldrich, inventory number 216763-500ML) to 29.0 g of deionized water, in a 40 ml glass vial with a plastic snap-on cap.
3. For all examples, an amount of dry SAP of weight "M0" of $$2.00 \text{ g} \pm 0.02 \text{ g}$$

was measured on a balance into a glass vial of 40 ml volume.

4. Separately, the respective amount of aqueous carrier, with salt diluted therein, as described under point 2. above with mass "Ms0" for each example was prepared in a 100 ml glass beaker (Pyrex), comprising the respective volumes in ml (the density of all solutions was 1.0 g/ml) of 0.5 weight % resp. oxidative salt stock solution ("m_salt_sol") and of additional deionized water ("m_water") (i.e. further amount of aqueous carrier) and, for those examples comprising HPO as indicated in Table 1, 1.0 weight % hydrogen peroxide solution ("m_HPO"), measured in by Eppendorf pipettes equipped with 10 ml plastic pipette tips, so that the effective final weight concentrations, "w_salt" for the salt and "w_HPO" for HPO are obtained as given in Table 1.
5. The amount "Ms0" of aqueous carrier, with salt dissolved therein, as prepared under point 4., was added to the dry SAP in the glass vial so that all SAP particles are in contact with the aqueous carrier, with salt dissolved therein. The amount "Ms0" for each example is given in Table 1. Where needed slight shaking by hand was applied to improve the wetting and uniform swelling of all SAP particles in each sample. Typically, it took between 10 and 60 seconds until the complete amount of aqueous carrier, with salt dissolved therein, was absorbed into the SAP. The amount of aqueous carrier with dissolved salt in the SAP was therefore Ms0/M0.
6. The samples in the glass vial were then closed with a snap-on plastic cap and left to stay for 10 min.
7. A circulation oven (Binder GmbH, Germany, Modell FED 720) was pre-heated to the temperature (i.e. the "elevated temperature") shown in column "Temperature T" in Table 1. When the temperature was reached, the respective vials with the samples therein were placed in it on an aluminum tray and a chronometer is started.
8. After the time shown in column "Time" in Table 1 is passed, the respective samples in the glass vials were taken out and left to cool down for 10 min.
9. Afterwards, the samples were transferred from the glass vial into a centrifuge vial (Plastic 100 ml centrifugation vials with screw caps). The centrifuge vials were put in a lab centrifuge (Multifuge X1m Thermo Scientific™, equipped with a BIOshield™ 720 rotor) and centrifuged for 30 min at 5000 rpm (equivalent for this setup to 4528 g-force). The centrifugation precipitated any remaining non-degraded and non-soluble parts of the SAP from a clear solution that was formed during degradation. When no liquid was observed to have formed, no centrifugation was performed, e.g. in comparative examples C1 through C4.
10. For all centrifuged samples, the clear solution was decanted and into a separate glass vial (40 ml) and thus separated from any remaining non-degraded and non-soluble parts of the SAP.
11. The netto weight of the clear solution "Ms" was measured. An aliquot part of the clear solution with mass "m_a" is measured via 5 ml plastic syringe into a pre-weighed 10 ml glass vial of empty (without snap-on cap) weight of "m_sc". The 10 ml vial with the clear solution is then put into a vacuum oven (Heraeus Vacutherm type, Thermo Scientific™) at 40° C. and pressure between 10 and 50 mbar for 3 hours to ensure substantial evaporation of the water. The dry polymeric residue is weighed and its mass "Mp" is used to calculate the yield "% Y" of the degradation via the formula:

$$Y=100*(Mp\times Ms)/(m\_a\times M0) \text{ in weight-\%}$$

The yield Y represents therefore the ratio of the extracted soluble polymer as product of SAP degradation solution, to the amount of the initial dry SAP. Given that the SAP was a cross-linked network of polyacrylic acid, the extracted soluble polymer was substantially soluble polyacrylic acid 12. The test conditions of sample A8 were identical to sample A18** to determine reproducibility of the test procedure.

The details and results are given in Table 1.

TABLE 1

| Examples | | | | | | | | | | | | | | |
|---|---|---|---|---|---|---|---|---|---|---|---|---|---|---|
| Example | M0 [g] | m_salt sol [g] *) | m_HPO [g] | m_ water [g] | w_salt [weight-%] | w_HPO [weight-%] | m_w_ total [g] | Ms0, [g] | Temperature T [° C.] | Time [hours] | Ms [g] | m_a [g] | Mp [g] | Y [weight-%] |
| A1 | 2.02 | 6 | 0 | 24 | 0.1 | 0 | 29.97 | 30 | 80 | 3 | 17.06 | 2.0169 | 0.1208 | 50.6 |
| A2 | 2.00 | 6 | 0 | 24 | 0.1 | 0 | 29.97 | 30 | 80 | 4 | 12.72 | 2.0269 | 0.1123 | 35.2 |
| A3 | 2.00 | 3 | 0 | 27 | 0.05 | 0 | 29.985 | 30 | 80 | 4 | 8.42 | 2.0099 | 0.1308 | 27.4 |
| A5 | 2.00 | 6 | 3 | 21 | 0.1 | 0.1 | 29.94 | 30 | 80 | 3 | 18.67 | 2.0179 | 0.1296 | 60.0 |
| A6 | 2.02 | 4 | 0 | 16 | 0.1 | 0 | 19.98 | 20 | 80 | 3 | 3.1 | 2.014 | 0.153 | 11.7 |
| A7 | 2.00 | 6 | 0 | 24 | 0.1 | 0 | 29.97 | 30 | 100 | 3 | 19.05 | 2.0166 | 0.178 | 84.1 |
| A8 | 1.99 | 4 | 0 | 16 | 0.1 | 0 | 19.98 | 20 | 100 | 3 | 10.1 | 2.0087 | 0.2188 | 55.3 |
| A9 | 2.01 | 4 | 1 | 15 | 0.1 | 0.05 | 19.97 | 20 | 80 | 3 | 7.71 | 2.0009 | 0.1949 | 37.4 |
| A10 | 2.02 | 4 | 0.5 | 15.5 | 0.1 | 0.025 | 19.975 | 20 | 80 | 3 | 7.42 | 2.028 | 0.2041 | 37.0 |
| A11 | 1.99 | 4 | 1 | 15 | 0.1 | 0.05 | 19.97 | 20 | 100 | 3 | 14.31 | 2.0008 | 0.2274 | 81.7 |
| A12 | 2.00 | 4 | 1 | 15 | 0.1 | 0.05 | 19.97 | 20 | 110 | 1 | 9.92 | 2.01435 | 0.249 | 61.3 |
| A15 | 2.00 | 4 | 0 | 16 | 0.1 | 0 | 19.98 | 20 | 100 | 3 | 9.93 | 2.0157 | 0.2046 | 50.4 |
| A17 | 2.00 | 20 | 0 | 0 | 0.5 | 0 | 19.9 | 20 | 100 | 3 | 14.26 | 2.0117 | 0.2143 | 76.0 |
| A18**) | 2.00 | 4 | 0 | 16 | 0.1 | 0 | 19.98 | 20 | 100 | 3 | 9.6 | 2.0019 | 0.2193 | 52.6 |
| C1 | 2.00 | 0 | 1.5 | 28.5 | 0 | 0.05 | 29.985 | 30 | 80 | 4 | no liquid | — | — | 0.0 |
| C2 | 1.99 | 0 | 0 | 30 | 0 | 0 | 30 | 30 | 80 | 4 | no liquid | — | — | 0.0 |
| C3 | 2.01 | 0 | 1 | 19 | 0 | 0.05 | 19.99 | 20 | 100 | 3 | no liquid | — | — | 0.0 |
| C4 | 2.00 | 0 | 0 | 20 | 0 | 0 | 20 | 20 | 100 | 3 | no liquid | — | — | 0.0 |

*) All examples with potassium persulfate $K_2S_2O_8$, except A15, which was with sodium persulfate $Na_2S_2O_8$.
**)A18 is repeated A8 option/conditions to confirm repeatability.
Comparative examples C1 to C4 were done without any salt.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading crosslinked, poly(acrylic acid)-based superabsorbent polymer (SAP) into soluble polyacrylic acid polymers, comprising:

a) providing SAP;

b) providing an oxidative water-soluble salt comprising at least one cation and at least one anion, wherein the at least one anion is selected from the group consisting of: peroxydisulfate, peroxymonosulfate, peroxydicarbonate, peroxy diphosphate, peroxydiborate, and mixtures thereof;

c) providing an aqueous carrier;

d) mixing the SAP with the oxidative water-soluble salt and the aqueous carrier to form a mixture;

e) heating the mixture to a temperature of from about 30° C. to about 200° C. to degrade the SAP into soluble polyacrylic acid polymers;

f) providing a mesh and capturing the SAP on the mesh;

g) degrading the SAP captured on the mesh, wherein the SAP is captured by the mesh until the SAP has degraded sufficiently to pass through the mesh;

wherein a ratio of the oxidative water-soluble salt to SAP is from about 0.001 g to about 0.05 g of oxidative salt per 1 gram of SAP.

2. The method of claim 1, wherein the oxidative water-soluble salt is dissolved in the aqueous carrier prior to method step d) or in method step d).

3. The method of claim 2, wherein at least about 50 weight % of the aqueous carrier, with the oxidative water-soluble salt dissolved therein, is absorbed into the SAP in method step d) and/or e).

4. The method of claim 1, wherein the amount of aqueous carrier provided in method step c) enables the SAP provided in step a) to swell to at least about 20% of the SAP's Centrifuge Retention Capacity (CRC) upon absorption of all aqueous carrier provided, wherein the CRC is measured according to EDANA method NWSP 241.0.R2.

5. The method of claim 1, wherein the cation is selected from the group consisting of: Li+, Na+, K+, Rb+, Cs+, NH4+, organically substituted ammonium, Ca2+, Mg2+, Sr2+, Ba2+, Al3+, transition metal cations of 1+ to 3+ oxidation state, and mixtures thereof.

6. The method of claim 1, wherein at least 50% by total weight of the oxidative water-soluble salt is an alkaline peroxydisulfate.

7. The method of claim 1, wherein the method further comprises the step of adding hydrogen peroxide.

8. The method of claim 1, wherein the ratio of aqueous carrier to SAP is from about 2 g to about 20 g of aqueous carrier per 1 gram of dry SAP.

9. The method of claim 1, wherein the SAP provided in step a) is dry SAP or is swollen to from about 0.05 g to about 10 g per 1 gram of dry SAP.

10. The method of claim 1, wherein the SAP provided in step a) has a CRC value of about 10 g/g to about 50 g/g as measured according to EDANA method NWSP 241.0.R2.

11. The method of claim 1, wherein the mixed SAP, oxidative water-soluble salt and the aqueous carrier are maintained at the temperature of method step e) for about 10 minutes to about 3 hours.

12. The method of claim 1, wherein the temperature to which the mixture is heated in step e) is at least about 10° C. below the decomposition temperature of the oxidative water soluble salt.

13. The method of claim 1, wherein the SAP is provided in step a) in particulate form.

14. The method of claim 1, wherein additives are added in method step d) and wherein the total amount of additives is not more than about 10 weight % based on the weight of the aqueous carrier.

15. The method of claim 1, providing the SAP as a continuous stream.

16. The method of claim 1, wherein the aqueous carrier and the oxidative water-soluble salt are provided as a spray.

17. The method of claim 1, wherein the mixture is free of additional oxidative water-soluble salt.

18. A method for degrading crosslinked, poly(acrylic acid)-based superabsorbent polymer (SAP) into soluble polyacrylic acid polymers, comprising:

a) providing SAP;

b) providing an oxidative water-soluble salt comprising at least one cation and at least one anion, wherein the at least one anion is selected from the group consisting of: peroxydisulfate, peroxymonosulfate, peroxydicarbonate, peroxydiphosphate, peroxydiborate, and mixtures thereof, wherein the oxidative water-soluble salt is substantially free of other anions;

c) providing an aqueous carrier;

d) mixing the SAP with the oxidative water-soluble salt and the aqueous carrier to form a mixture; and e) heating the mixture to a temperature of from about 30° C. to about 200° C. at a pH of from about 3 to about 7 to degrade the SAP into soluble polyacrylic acid polymers, f) passing the mixture through a mesh so that the soluble polyacrylic acid polymers pass through the mesh and retaining the SAP that has not degraded on the mesh until it degrades, wherein a ratio of the oxidative water-soluble salt to SAP is from about 0.001 g to about 0.05 g of oxidative salt per 1 gram of SAP, and wherein the soluble polyacrylic acid polymers comprise an average molecular weight, Mw, of from about 10 kDa to about 10 MDa.

19. A method for degrading crosslinked, poly(acrylic acid)-based superabsorbent polymer (SAP) into soluble polyacrylic acid polymers, consisting essentially of:

a) providing SAP;

b) providing an oxidative water-soluble salt comprising at least one cation and at least one anion, wherein the at least one anion is selected from the group consisting of: peroxydisulfate, peroxymonosulfate, peroxydicarbonate, peroxy diphosphate, peroxydiborate, and mixtures thereof;

c) providing an aqueous carrier;

d) mixing the SAP with the oxidative water-soluble salt and the aqueous carrier to form a mixture; and e) heating the mixture to a temperature of from about 30° C. to about 200° C. to degrade the SAP into soluble polyacrylic acid polymers, f) passing the mixture through a mesh so that the soluble polyacrylic acid polymers pass through the mesh and retaining the SAP that has not degraded on the mesh, wherein a ratio of the oxidative water-soluble salt to SAP is from about 0.001 g to about 0.05 g of oxidative salt per 1 gram of SAP.

* * * * *